(12) United States Patent
Teshima et al.

(10) Patent No.: US 8,123,398 B2
(45) Date of Patent: Feb. 28, 2012

(54) FLUID-PROCESSING DEVICE

(75) Inventors: Takayuki Teshima, Yokohama (JP);
Takeo Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 11/995,729

(22) PCT Filed: Aug. 7, 2006

(86) PCT No.: PCT/JP2006/315977
§ 371 (c)(1),
(2), (4) Date: Jan. 15, 2008

(87) PCT Pub. No.: WO2007/018298
PCT Pub. Date: Feb. 15, 2007

(65) Prior Publication Data
US 2009/0031923 A1    Feb. 5, 2009

(30) Foreign Application Priority Data

Aug. 9, 2005  (JP) ................................. 2005-231267

(51) Int. Cl.
*B01F 5/04* (2006.01)
(52) U.S. Cl. ................................. 366/173.2; 366/178.2
(58) Field of Classification Search .... 366/178.1–178.2, 366/181.6, 173.1–173.2, 162.1, 167.1, 176.1, 366/177.1
See application file for complete search history.

(56) References Cited

U.S. PATENT DOCUMENTS

| | | | | |
|---|---|---|---|---|
| 4,408,890 A | * | 10/1983 | Beckmann | 366/155.2 |
| 4,999,131 A | * | 3/1991 | Shimizu et al. | 516/53 |
| 6,851,846 B2 | * | 2/2005 | Fujii et al. | 366/173.2 |
| 2003/0082079 A1 | | 5/2003 | Sawano | |
| 2004/0011413 A1 | | 1/2004 | Fujii et al. | |
| 2005/0007872 A1 | * | 1/2005 | Nagasawa et al. | 366/178.2 |
| 2009/0031923 A1 | * | 2/2009 | Teshima et al. | 137/602 |

FOREIGN PATENT DOCUMENTS

| | | | |
|---|---|---|---|
| CH | 688868 | | 4/1998 |
| DE | 10035731 | | 1/2002 |
| JP | 59183820 A | * | 10/1984 |
| JP | 2002-292274 A | | 10/2002 |

OTHER PUBLICATIONS

International Search Report issued on Nov. 7, 2006 for International Application No. PCT/JP2006/315977.

* cited by examiner

*Primary Examiner* — Charles E Cooley
(74) *Attorney, Agent, or Firm* — Canon U.S.A. Inc., I.P. Division (57) ABSTRACT

A fluid-processing device is provided for bringing two kinds of fluids into contact to mix or react with each other. The device comprises a first supply path connected to a first feed inlet for feeding a first fluid for supplying the first fluid, and plural second supply paths connected to a second feed inlet for feeding a second fluid for supplying the second fluid; the second supply paths being arranged along supply direction of the first fluid, the second supply paths being surrounded by the first fluid, the second fluid discharged from fluid outlets of the second supply paths being brought into contact with the first fluid in the first supply path.

5 Claims, 11 Drawing Sheets

FLUID-PROCESSING DEVICE

TECHNICAL FIELD

The present invention relates to a fluid-processing device for mixing and reaction of fluids by supplying the fluids in a laminar flow state through a flow channel of a micro-scale and allowing the fluids to diffuse through the contact interface to cause mixing and/or reaction of the fluids. The present invention relates also to a fluid-processing method employing the device.

BACKGROUND ART

Recently, various mixer devices are being developed which mix fluids in a laminar flow state in a flow channel having a width of a micro-scale and allow the fluids to diffuse through the contact interface. Such mixer devices are called a micromixer or a micro-reactor, and are developed for chemical reaction, micro-analysis, and the like applications. In conventional batch systems, mass production is conducted by enlargement, so-called scale-up, of the reaction vessel. In contrast, in production of a chemical substance or the like with the mixer device, the mass production can be attained by employing many mixer units arranged in parallel.

The above-mentioned mixer devices are in a size of microscale: the size of the flow channel is small, and the flow rate of the fluid in the flow channel is low, resulting in a small Reynolds number of the flow. Therefore, the fluid flowing through the flow channel in a micro-scale is generally laminar-flow-controlled, being different from the turbulent-flow-controlled batch type of reaction apparatus. Under the laminar-flow-controlled conditions, two fluids brought into contact are mixed mainly by diffusion through the interface of the two fluids. Further, in a micro-scale space in which the surface area for a unit volume is large, the diffusion mixing occurs quickly at the interface of the two laminar flows advantageously.

Generally, according to Fick's law, the time for diffusion is proportional to the square of the diffusion distance. Therefore, the time for the mixing by molecular diffusion is shorter for a smaller width of the flow channel. For the flow channel width reduced by a factor or $\frac{1}{10}$, the mixing time is reduced by a factor of $\frac{1}{100}$. In the micro-scale space, molecular transport, reaction, and separation proceed quickly by spontaneous behavior of the molecules without mechanical agitation.

Therefore, the reaction under the laminar flow conditions in a micro-scale reactor, the reaction can proceed at a higher rate than the reaction under turbulent conditions in a conventional batch type of reaction apparatus. In the laminar flow state, two liquids are brought into contact invariably at the same timing to be mixed or to react, enabling uniform mixing and regular reaction.

In a conventional batch type reactor, a primary reaction product can react further in the reactor to result in non-uniformity of the product. In particular, in production of a fine particulate material, particles formed primarily can react further to grow to cause non-uniformity of the fine particles. In contrast, in the micro-scale mixer device, the fluids flow through the micro-scale flow channel continuously without stagnation, which prevents a successive reaction of the formed fine particles to improve the uniformity of the formed fine particles.

Among various newly developed mixer devices, Japanese Patent Application Laid-Open No. 2003-210959, for example, discloses a mixer device for mixing effectively two fluids in a laminar flow state in a micro-scale flow channel. In the disclosed mixer device, two kinds of solutions are allowed to flow out through nozzles in slender bar-shaped laminar flows. The slender bar-shaped laminar flows have a large specific interface area of contact to enable shortening of the time for mixing.

However, the fluids introduced through adjacent nozzles will join together on leaving the nozzle into the mixing flow path. Therefore, it is not easy to form slender bar-shaped laminar flows. When the opening width is kept unchanged and the rod-shaped straightening member is made thick, a larger space could be occupied by the rod-shaped straightening member.

Japanese Patent Application Laid-Open No. 2001-340753 discloses a micro-reactor which allows plural chemical reactions to proceed by flowing plural kinds of fluids in one mixing flow channel. However, since the plural reactions proceed in one and the same mixing flow path, a fluid can remain partly in the flow channel to become an impurity in another chemical reaction.

The present invention is made on such a technical background, and intends to provide a fluid-processing device which utilizes a large specific interface area between the fluids to be mixed for effective diffusion without causing stagnation of the fluids and formed product in the micro-flow channel.

DISCLOSURE OF THE INVENTION

According to an aspect of the present invention, there is provided a fluid-processing device for bringing two kinds of fluids into contact to mix or react with each other, comprising a first supply path connected to a first feed inlet for feeding a first fluid for supplying the first fluid, and plural second supply paths connected to a second feed inlet for feeding a second fluid for supplying the second fluid; the second supply paths being arranged along supply direction of the first fluid, the second supply paths being surrounded by the first fluid, the second fluid discharged from fluid outlets of the second supply paths being brought into contact with the first fluid in the first supply path.

The first supply path preferably has a rectangular cross-section perpendicular to a fluid supply direction.

The rectangle has preferably a short side of a length ranging from 100 μm to 3000 μm.

The second supply path has preferably a diameter ranging from 50 μm to 2000 μm.

The second flow paths are preferably arranged in the direction of length in the rectangle.

The first supply path preferably has a cross-section in a ring shape perpendicular to a fluid supply direction. The plural second supply paths are preferably arranged along the ring shape.

According to another aspect of the present invention, there is provided a method for processing a fluid, comprising (1) providing a fluid-processing device for bringing two kinds of fluids into contact to mix or react with each other which comprises a first supply path connected to a first feed inlet for feeding a first fluid for supplying the first fluid, and plural second supply paths connected to a second feed inlet for feeding a second fluid for supplying the second fluid; the second supply paths being arranged along supply direction of the first fluid, the second supply paths being surrounded by the first fluid, the second fluid discharged from fluid outlets of the second supply paths being brought into contact with the first fluid in the first supply path, and (2) feeding the first fluid to the first feed inlet, and feeding the second fluid to the second feed inlet.

The first fluid is preferably a solution of a pigment, and the second fluid is a solvent which lowers the solubility of the dissolved pigment.

The first fluid is preferably a solution of a coupler and the second fluid is a solution containing a diazonium salt.

According to still another aspect of the present invention, there is provided a process for producing a dispersion of a pigment by supplying a solution of a pigment and a dispersant and a solvent for lowering the solubility of the pigment for mixing and reaction of the solution and the solvent, comprising (1) providing a fluid-processing device for bringing two kinds of fluids into contact to mix or react with each other which comprises a first supply path connected to a first feed inlet for feeding a first fluid for supplying the first fluid, and plural second supply paths connected to a second feed inlet for feeding a second fluid for supplying the second fluid; the second supply paths being arranged along supply direction of the first fluid, the second supply paths being surrounded by the first fluid, the second fluid discharged from fluid outlets of the second supply paths being brought into contact with the first fluid in the first supply path, and (2) feeding one of the solution and the solvent to the first feed inlet, and feeding the other one of the solution and the solvent to the second feed inlet.

Further features of the present invention will become apparent from the following description of exemplary embodiments (with reference to the attached drawings).

BRIEF DESCRIPTION OF THE DRAWINGS

FIGS. 1A and 1B are sectional views of the fluid-processing device of Example 1: FIG. 1A is taken in the fluid flow direction, and FIG. 1B is taken along line 1B-1B in FIG. 1A.

FIGS. 2A and 2B are sectional views of the fluid-processing device of Example 2: FIG. 2A is taken in the fluid flow direction, and FIG. 2B is taken along line 2B-2B in FIG. 2A.

FIGS. 3A and 3B are sectional views of the fluid-processing device of Example 4: FIG. 3A is taken in the fluid flow direction, and FIG. 3B is taken along line 3B-3B in FIG. 3A.

FIGS. 4A and 4B are sectional views of the fluid-processing device of Example 5: FIG. 4A is taken in the fluid flow direction, and FIG. 4B is taken along line 4B-4B in FIG. 4A.

FIGS. 5A and 5B are sectional views of the fluid-processing device of Example 6: FIG. 5A is taken in the fluid flow direction, and FIG. 5B is taken along line 5B-SB in FIG. 5A.

BEST MODE FOR CARRYING OUT THE INVENTION

A fluid-processing device of a first embodiment of the present invention is explained by reference to FIGS. 1A and 1B. In the description below, the fluid-processing device is occasionally referred to as a mixer device.

Fluid-processing device 1 has casing walls 22,23,25,26; plural nozzles 5 for discharging a fluid placed in the interspace between opposing casing walls 22,23; space 44 consisting of clearances between the nozzles and the casing walls and intervals between the nozzles; micro-flow channel 6 for mixing a first fluid supplied through space 44 and a second fluid supplied through nozzle 5; first feed inlet 2 for feeding the first fluid to space 44; and second feed inlet 3 for feeding the second fluid to nozzle 5. In this Example, space 44 and micro-flow channel 6 constitute a first supply path, and, nozzles 5 constitute a second supply path. The ends 30 of nozzles 5 are fluid discharge outlets of the second supply path.

End Clearances between casing walls 25 and 26, which are not casing walls related to the interspace, and nozzle 5 and the intervals between nozzles 5 constitute thin spaces 4. The thin space 4 is explained below.

The width of the interspace, which is equal to the distance d between casing walls 22, 23, may be in a micro-scale in the range from 100 µm to 3000 µm. The smaller the width of the flow channel, the quicker is the mixing by molecular diffusion. Therefore, the flow channel width is preferably not more than 3000 µm, more preferably not more than 1000 µm, still more preferably not more than 500 µm.

The nozzles 5 placed in the interspace have an outside diameter equal to or less than thin space 4. Specifically the outside diameter of the nozzle 5 ranges from 50 µm to 3000 µm, preferably from 50 µm to 2000 µm.

Owing to the outside diameter of nozzles 5 not larger than the thin space 4, the flow of the fluids introduced from first feed inlet 2 and second feed inlet 3 have respectively a small Reynolds number to flow in a laminar flow state. On contact of the two fluids in a laminar flow state, the mixing of the fluids occurs mainly by diffusion through the interface.

In a micro-scale space, in which the surface area is large for the volume, diffusion and mixing of two fluids or a chemical process utilizing the interface can be conducted efficiently.

The first feed inlet is provided in the first supply path in the upstream side of the fluid outlet of the second supply path. Therefore, the first fluid introduced from the first feed inlet fills space 44 comprised of thin space 4, and flows through the thin space 4 in a laminar flow state to micro-flow channel 6. This first fluid comes into contact with the second fluid flowing out from nozzles 5. The second fluid is discharged from nozzles 5 in slender bar-shaped laminar flow streams into the laminar flow of the first fluid discharged from the end of thin space 4 around the nozzle outlets 30. Thus the flow of the first fluid surrounds the streams of the second fluid discharged from the nozzles. With this constitution, the specific contact area is larger between the first fluid and the second fluid in micro-flow channel 6, whereby diffusion and mixing are caused efficiently.

The fluids are allowed to flow linearly through micro-flow channel 6 without abrupt change of the flow direction without stagnation, and are discharged through discharge outlet (not shown in the drawing).

The cross-section of the thin space 4 may be annular, rectangular, U-shaped, or L-shaped perpendicular to the fluid flow direction (supply direction of the first fluid in the first supply path, indicated by arrow mark 100). However, in consideration of the flow rate distribution in the direction perpendicular to the fluid supply direction (toward the casing wall-contact portion of the thin space), the shape is preferably annular. When the shape of the cross-section of the interspace is rectangular, U-shaped, or L-shaped, the corner portion of the cross-section may be rounded.

The length of micro flow channel 6 in the fluid flow direction is designed for an intended mixing or reaction state.

The pitch between nozzles 5 is preferably uniform. More preferably the pitch is designed so that the second fluid flows discharged from the adjacent nozzles do not join together.

The diameter of the nozzles may be made smaller and nozzles may be arranged in plural lines, not a single line.

The shape of the nozzle opening need not be round, but may be tetragonal, hexagonal, or ellipsoid.

For mass production, the mixer device of the present invention is installed in plurality.

Thin space 4 and nozzles 5 have a length of preferably not more than 100 mm, more preferably not more than 50 mm, still more preferably not more than 30 mm in the nozzle length direction.

The flow rates of the fluids flowing through thin space 4 and nozzles 5 are, for the laminar flow state, preferably not more than 10 m/s, more preferably not more than 1 m/s, still more preferably not more than 0.5 m/s.

A fluid-processing device (mixer device) of a second embodiment of the present invention is explained by reference to FIGS. 4A and 4B.

Peripheral mixer element 7 is constructed from two tubes of different diameters (inner tube 10 and outer tube 11 of the peripheral mixer element) placed coaxially; and plural nozzles 5 placed in the interspace having an annular cross-section perpendicular to the fluid supply direction so as to form thin space 4.

Inner mixer element 8 is placed inside the peripheral mixer element 7 coaxially. Inner mixer element 8 is constituted of tubes of different diameters similarly as peripheral mixer element 7, and has plural nozzles 5 in the interspace having an annular cross-section perpendicular to the fluid flow direction so as to form thin space 4. In this mixer device, as shown in FIGS. 4A and 4B, inner tube 10 is utilized as the outer tube of inner mixer element 8 to decrease the number of the tubes.

Inside the inner mixer element 8, innermost mixer element 9 is placed coaxially. This innermost mixer element 9 is constituted of tubes of different diameters similarly as peripheral mixer element 7, and has plural nozzles 5 in the interspace having annular cross-section perpendicular to the fluid flow direction so as to form thin space 4. In this mixer device, inner tube 12 of the inner mixer element is utilized as the outer tube of innermost mixer element 9 to decrease the number of the tubes.

A first feed inlet 2 for feeding a first fluid to the thin space 4 is provided on outer tube 11, and a second feed inlet 3 for feeding a second fluid to nozzles 5 is provided in a manner of covering inlets of the nozzles.

The feed inlet may be provided for each of the interspaces of peripheral mixer element 7, inner mixer element 8, and innermost mixer element 9 and each of the nozzles. This enables mixing of different fluids in respective mixer elements concurrently.

Figure 4A:
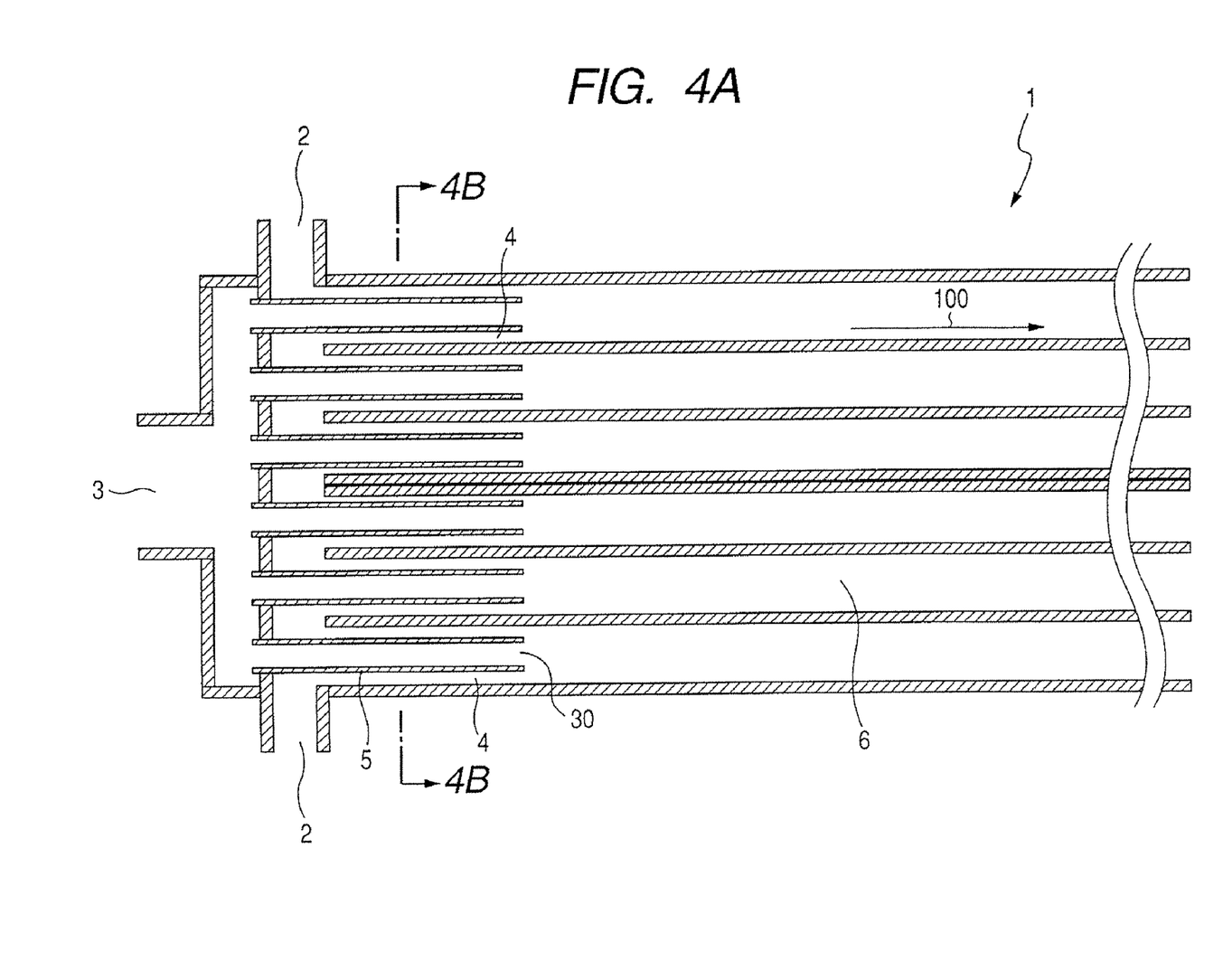
Figure 4B:
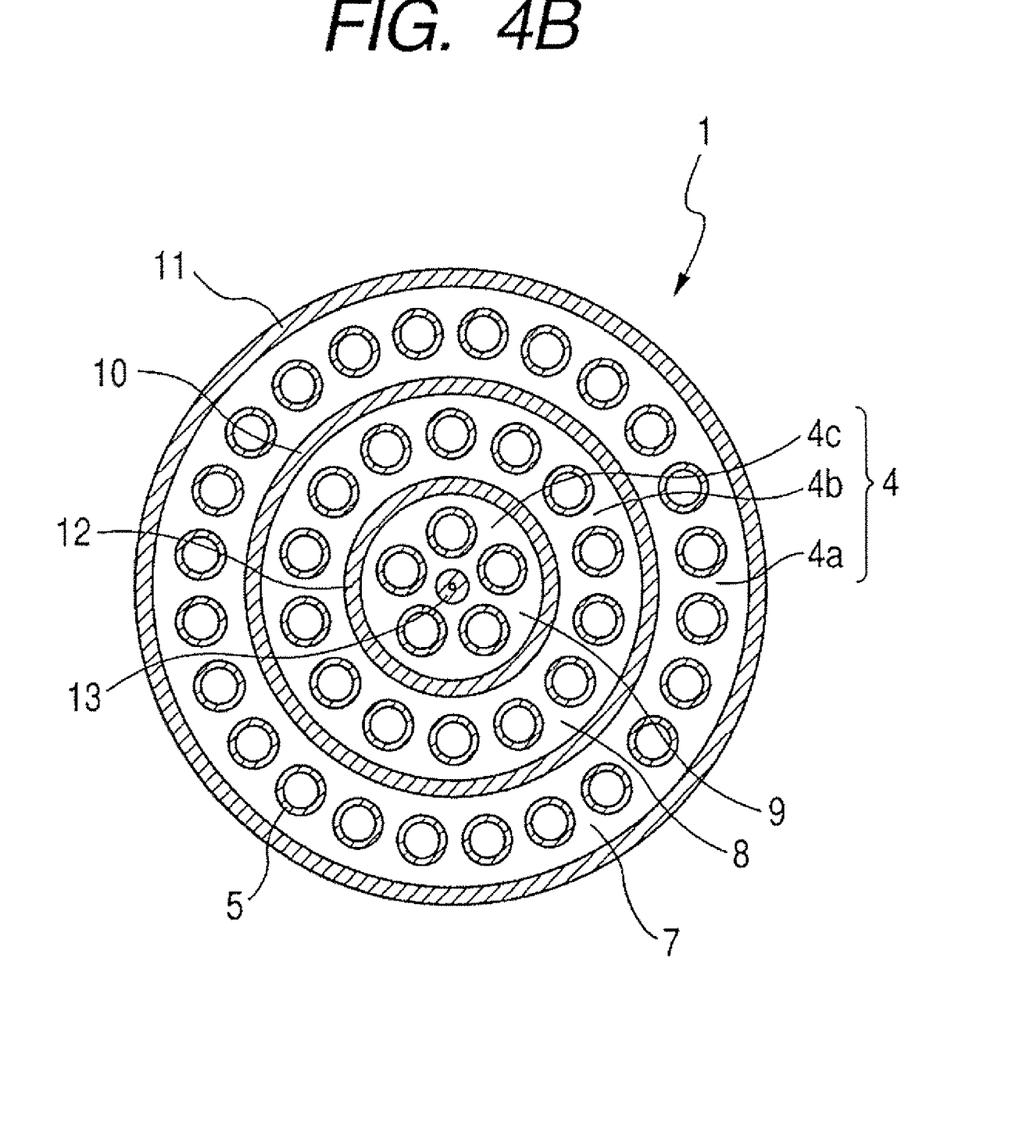

FIGS. 4A and 4B show a mixer device constituted of three elements of peripheral mixer element 7, inner mixer element 8, and innermost mixer element 9. However, the number of multiplication of the mixer elements around the center axis of the peripheral mixer element 7 is not limited thereto.

In this example, in the case where different kinds of mixing steps or chemical reactions are conducted concurrently and independently in the respective mixer element: the processed fluids from the respective mixer elements can be collected separately in a micro-flow channel 6 in the downstream (not shown in the drawing) by decreasing the length of thin space 4 in the fluid flow direction stepwise from the central mixer element to the peripheral mixer element.

The pitch of the nozzles 5 is preferably uniform. The nozzles are preferably arranged not to cause contact of the streams of the fluid leaving the adjacent nozzles in a slender bar-shaped laminar flow state. The nozzles may be arranged in plural lines by decreasing the outside diameter of the nozzles. The shape of the nozzle end need not be round, but may be tetragonal, hexagonal, or ellipsoidal. For mass production, the multiplication number of the mixer elements is increased or a plurality of the mixer devices are employed.

The construction material for the mixer device 1 of the present invention is selected from materials which are heat-resistant, pressure-resistant, and solvent-resistant for the fluid processed. The material includes metals, glass, silicon, Teflon®, and ceramics. Of these materials, metals are preferred. The metals include stainless steel, Hastelloy (Ni—Fe type alloy), nickel, gold, platinum, and tantalum. However, the metal material for the flow channel of mixer device 1 of the present invention is not limited thereto. For the corrosion resistance or desired surface energy, the flow-contacting surface may be lined.

The present invention relates also to a fluid-processing method. The fluid-processing method mixes plural fluids or causes reaction thereof by use of the fluid-processing device of the present invention. The fluid-processing method of the present invention is applicable to production of various compounds by selecting the supplied liquid. For example, two liquids are employed: one liquid containing a pigment and a dispersant dissolved therein, and another liquid being a solvent for lowering the solubility of the dissolved pigment. In this example, a pigment dispersion can be produced by reprecipitation of the fine pigment particles.

The pigment which can be dispersed by reprecipitation includes phthalocyanine pigments such as non-metal phthalocyanine, copper phthalocyanine, halogenated copper phthalocyanine, and titanyl phthalocyanine; azo pigments such as insoluble azo pigments, condensed azo pigments, azo lake, and chelate azo pigments; quinacridone pigments; isoindolinone pigments; indanthrone pigments; diketopyrrolopyrrole pigments; dioxazine pigments; perylene pigments; perinone pigments; and anthraquinone pigments, but are not limited thereto.

The medium for dissolving the pigment is explained below. Any organic solvent is useful which is capable of dissolving the organic pigment in the presence of alkali. The organic solvent has preferably a solubility in water of not lower than 5%. More preferably, the organic solvent is miscible with water.

The precipitation medium (poor solvent) for lowering the solubility of the pigment includes polyhydric alcohols such as ethylene glycol, diethylene glycol, triethylene glycol, polyethylene glycol, propylene glycol, polypropylene glycol, and glycerin; monohydric alcohols such as methanol, ethanol, and isopropyl alcohol; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; nitrogen-containing solvents such as N-methyl-2-pyrrolidone, substituted pyrrolidones, and triethanolamine; esters such as butyl acetate, and cellosolve acetate; ketones such as methyl ethyl ketone, cyclohexanone, and methyl isobutyl ketone; and hydrocarbons such as cyclohexane, heptane, octane, and isooctane. Water is useful in any pH range, but is preferably used in the pH range from 1 to 14. The precipitation medium may be used singly or in combination of two or more thereof.

For production of a pigment dispersion, a solution containing a pigment and a dispersant dissolved therein is fed through a feed inlet and a solvent for lowering the pigment solubility is introduced through another feed inlet into the processing device.

In another method, a pigment dispersion can be produced by a coupling reaction: a solution of a coupler and a dispersant and another solution containing a diazonium salt are brought into contact.

Other than the production of the pigment dispersion, the processing method of the present invention can be employed for production of compounds shown below.

A functional compound can be produced by causing a nucleophile addition reaction between a reaction solution containing electrophilic compound and another reaction solution containing a nucleophile compound. This reaction is exemplified by Grignard reaction, and Michael addition reaction.

Otherwise, a functional compound can be produced by a nucleophile substitution reaction between a reaction solution containing an electron-rich species and another solution containing a compound having an electron-deficient carbon atom. This reaction is exemplified by sulfidation of an alkyl halide, and halogenation of an alcohol.

Further, a functional compound can be produced by an electrophilic substitution reaction between a reaction solution containing an electron-deficient species and another solution containing a compound having an electron-rich carbon atom. This reaction is exemplified by halogenation, nitration, sulfonation, and Friedel-Crafts reaction of aromatic compounds.

In the processing method of the present invention, a first fluid flow surrounds second fluid streams discharged from the outlet of the second supply path. The second fluid comes into contact with a first fluid in a first supply path. This enlarges the contact area of the two fluids, and shortens the fluid diffusion time. As the result, the reaction proceeds in a short time, and a side reaction is prevented to improve the yield of the intended reaction product.

EXAMPLES

The present invention is explained specifically by reference to examples without limiting the invention in any way.

Example 1

The fluid-processing device (mixer device) of this Example is explained by reference to FIGS. 1A and 1B.

A first fluid is introduced through first feed inlet 2 and a second fluid is introduced through second feed inlet 3 into mixer device 1. In mixer device 1, the two fluids (first fluid and second fluid) introduced through first feed inlet 2 and second feed inlet 3 are mixed in a laminar flow state. In this Example, the two fluids cause a chemical reaction.

Figure 1A:
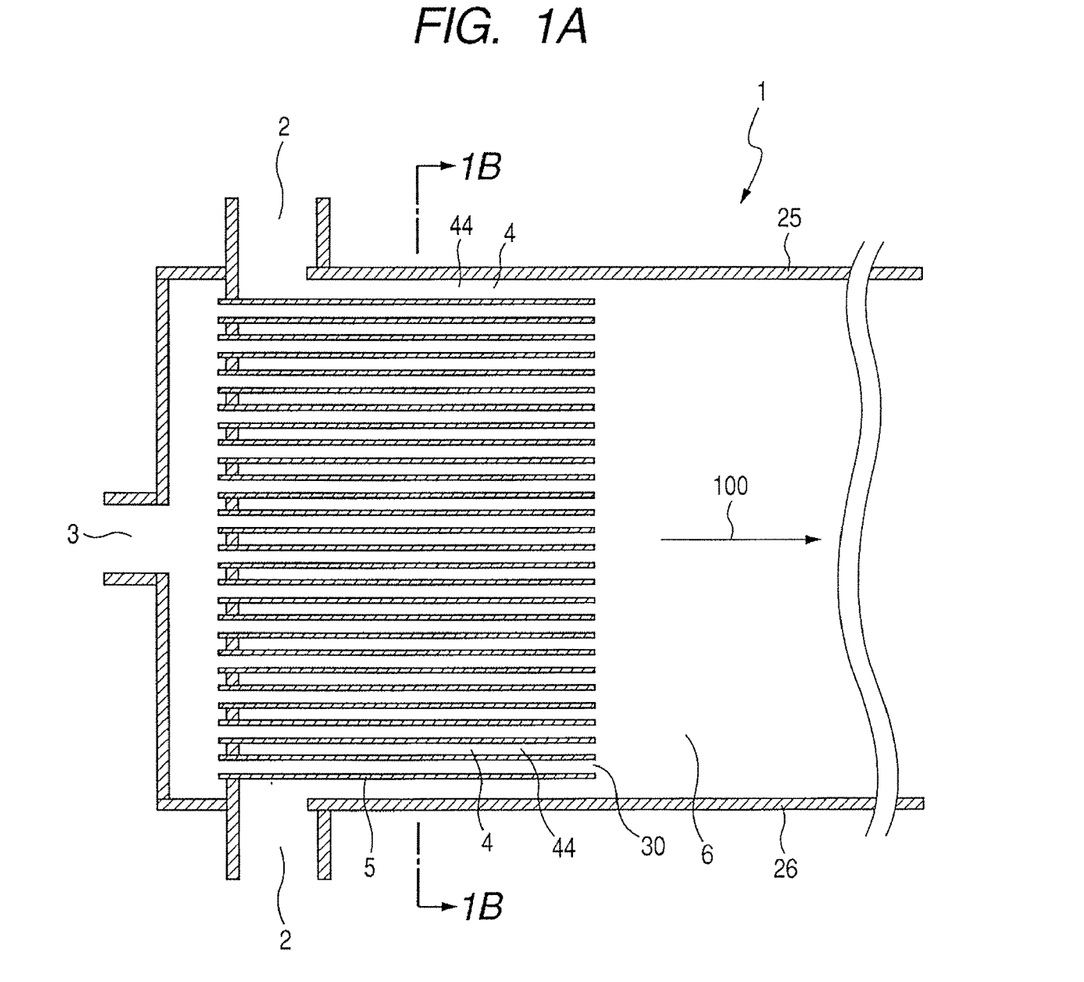
Figure 1B:
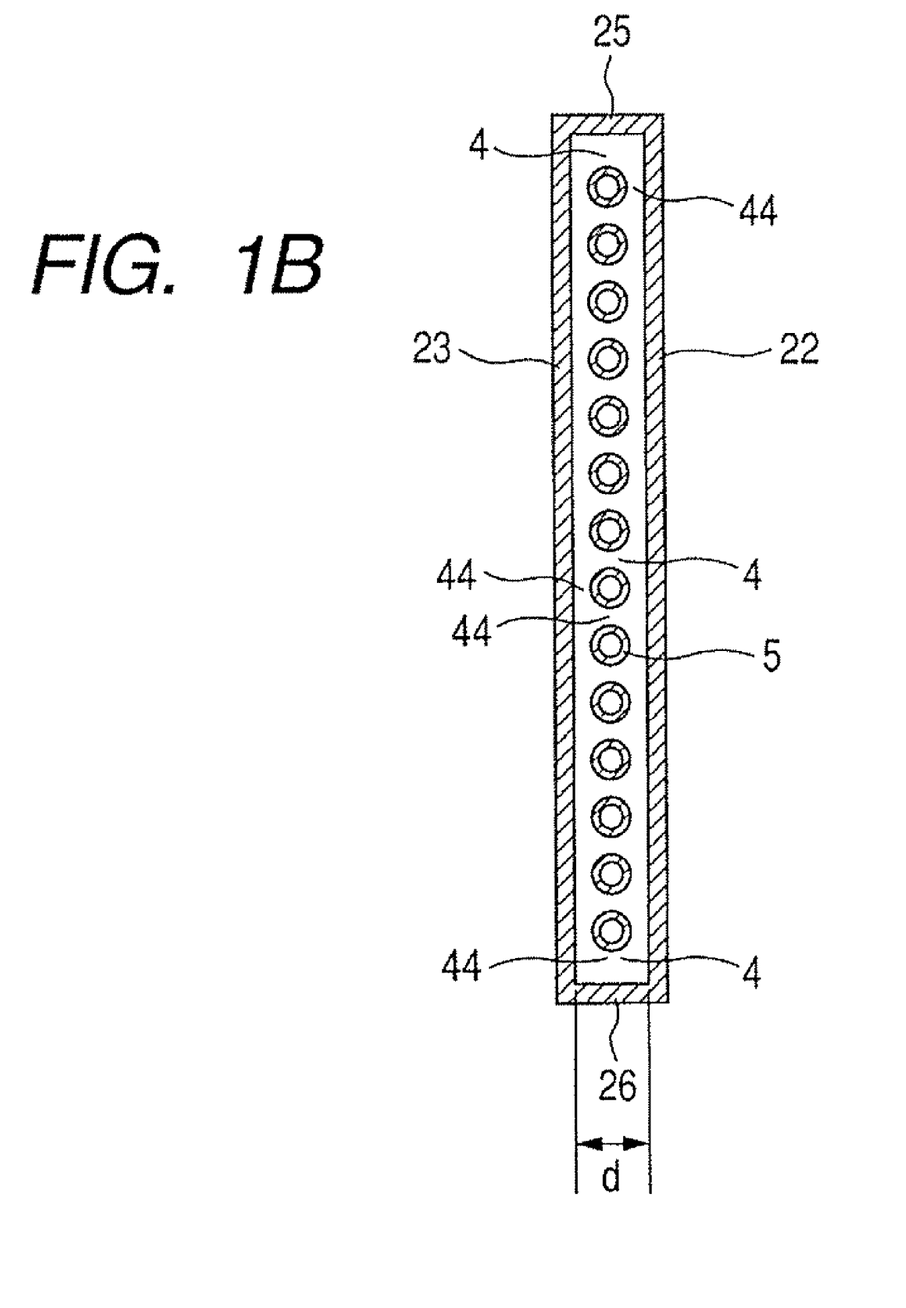

Mixer device 1, in FIGS. 1A and 1B, has a interspace surrounded by casing walls 22, 23, 25 and 26. This interspace has a rectangular cross-section perpendicular to the fluid flow direction, having a short side (width d) of 500 µm. Nozzles 5 are arranged along the middle line in the long side direction of the rectangle at a constant nozzle pitch so as to form thin spaces 4. The nozzle is a round pipe having an outside diameter of 300 µm, an inside diameter of 240 µm, and a length of 30 mm. Space 44 consists of the thin spaces 4 and clearances between nozzles 5 and the casing walls 22 and 23.

The first fluid is introduced through first feed inlet 2 into the space 44 at an upstream side of outlets of nozzles 5 for discharging the second fluid. The second fluid is introduced through second feed inlet 3 to nozzles 5. The first fluid passed through thin space 4 fills space 44 and then comes into contact with the second fluid flowing out from nozzles 5 in a microchannel 6 (not shown in the drawing). The streams of the second fluid are surrounded by the first fluid. Thereby the streams of the second fluid can be formed in a slender bar-shaped laminar flow state. The second fluid in a laminar flow state in a slender bar shape is improved in the area of contact in micro-flow channel 6 with the first fluid introduced through first feed inlet 2. After efficient diffusion and mixing, the fluid mixture is discharged from a discharge outlet (not shown in the drawing). In micro-flow channel 6, fluid stagnation will not occur, since the flow of the fluid is linear and abrupt flow change is not caused.

Example 2

The fluid-processing device (mixer device) of this Example is explained by reference to FIG. 2A and 2B. A first fluid is introduced through first feed inlet 2 and a second fluid is introduced through second feed inlet 3 into mixer device 1. In mixer device 1, the two fluids (first fluid and second fluid) introduced through first feed inlet 2 and second feed inlet 3 are mixed in a laminar flow state.

In this Example, the interspace is formed by two different tubes so as to have a cross-section in a ring-shape perpendicular to the direction of the flow in the interspace: inner tube 20 having an outside diameter of 26 mm, and outer tube 21 having inside diameter of 27 mm. Inner tube 20 is placed at the center of outer tube 21 to form a thin space of 500 µm between the outside wall of inner tube 20 and the inside wall of outer tube 21.

Figure 2A:
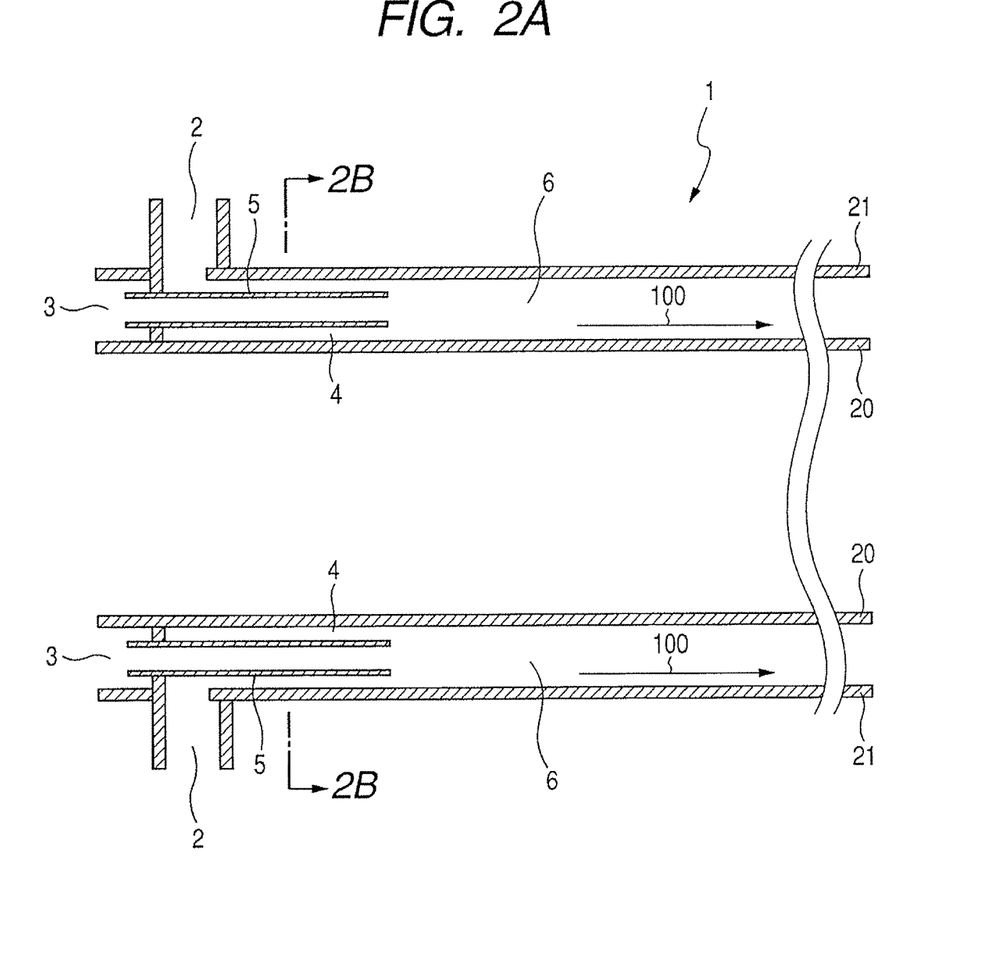
Figure 2B:
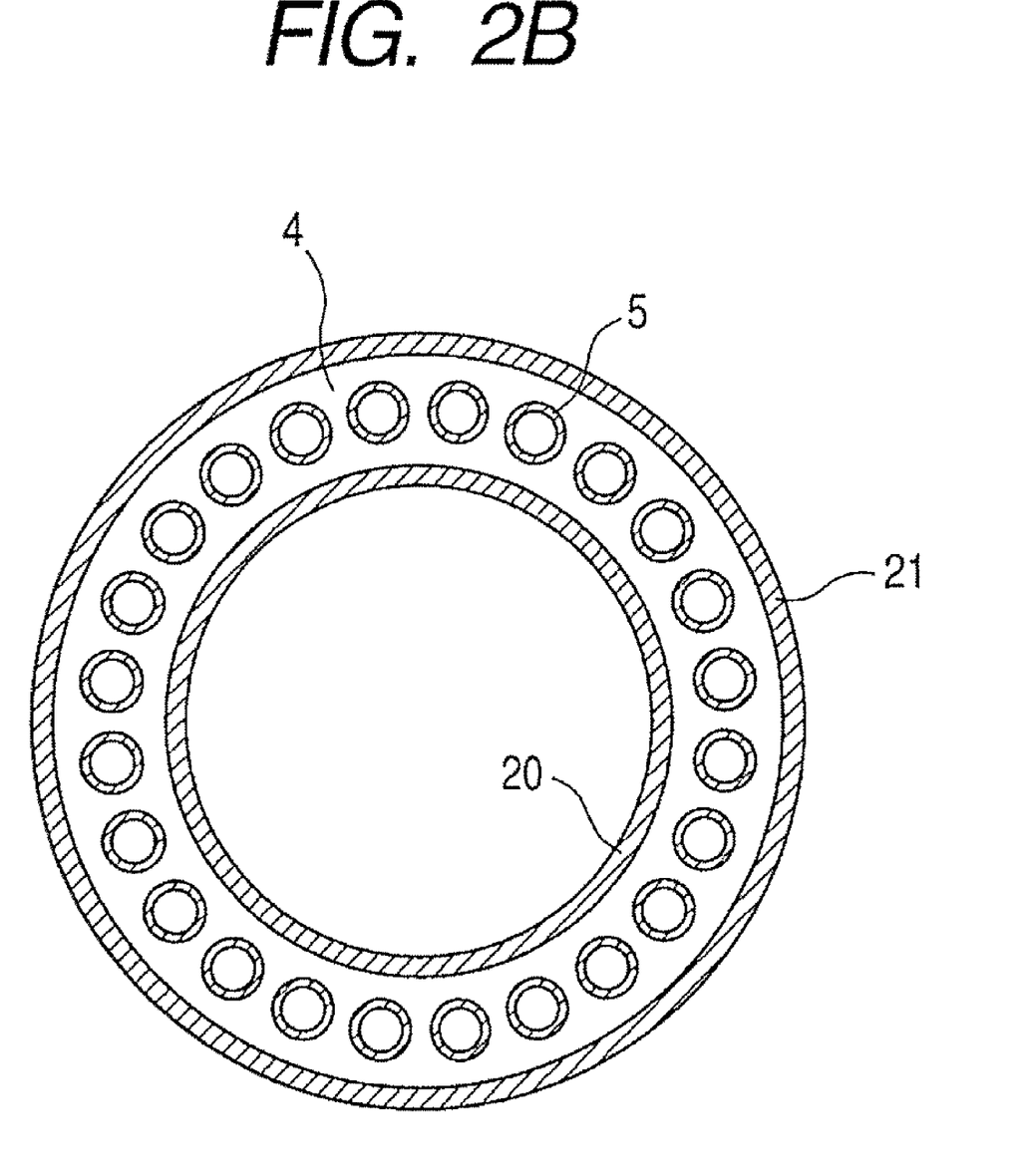

In FIGS. 2A and 2B, mixing device 1, nozzles 5 are placed along the middle line of the interspace between the inside wall of outer tube 21 and the outside wall of inner tube 20. The nozzles are arranged at a constant pitch in the periphery direction around the axis of inner tube 20 so as to form thin spaces 4. The nozzle is a circular pipe having an outside diameter of 300 µm and an inside diameter of 240 µm. Space 44 consists of the thin spaces 4 and clearances between nozzles 5 and the inner and outer tubes.

The first fluid is introduced through first feed inlet 2 into space 44 at the upstream side of the outlet of nozzles 5 feeding the second fluid. The second fluid is introduced through second feed inlet 3 to nozzles 5. The first fluid fills space 44 and then comes into contact with the second fluid flowing out from nozzles 5 in a micro-flow channel 6 (not shown in the drawing). The streams of the second fluid are surrounded by the flow of the first fluid passed through the thin spaces 4. Thereby the streams of the second fluid can be formed in a slender bar-shaped laminar flow.

The second fluid in a laminar flow state in a slender bar shape has an improved area of contact in micro-flow channel 6 with the first fluid introduced through first feed inlet 2. After efficient diffusion and mixing, the fluid mixture is discharged from a discharge outlet (not shown in the drawing). In micro-flow channel 6, fluid stagnation will not occur, since the flow of the fluid is linear and abrupt flow change is not caused. In the tubular thin laminar flow, the flow rate distribution occurs only in the direction of the distance between inner and outer tubes, which minimizes variation of mixing and reaction among nozzles 5.

Figure 6A:
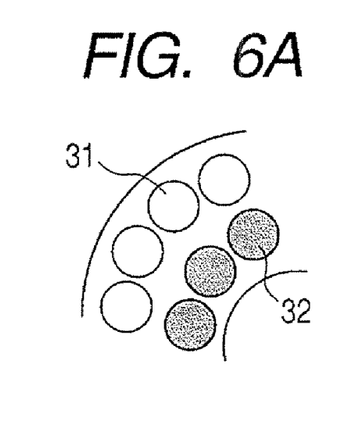
FIGS. 6A, 6B, 6C, and 6D are schematic drawings illustrating states of mixing and diffusion of two fluids in the mixing devices described in the prior art techniques.

The effects in this Example are explained below by reference to FIGS. 6A, 6B, 6C, and 6D and FIGS. 7A, 7B, 7C and 7D. FIGS. 6A, 6B, 6C, and 6D illustrate schematically mixing and diffusion in a mixing device shown in Japanese Patent Application Laid-Open No. 2003-210959 (FIG. 3 of the disclosure), a prior art technique of the present invention. In this mixing device of the prior art technique, two kinds of fluids, first fluid 31 and second fluid 32, are supplied in a state of slender bar streams. FIGS. 6A, 6B, 6C, and 6D illustrate schematically changes of the states of mixing and diffusion with lapse of time, observed from downstream side. On the other hand, FIGS. 7A, 7B, 7C and 7D illustrate a part of the fluid-processing device shown in FIG. 2B of this Example of the present invention. FIGS. 7A, 7B, 7C and 7D illustrate schematically change of the state of mixing and diffusion, with lapse of time, of two kinds of fluids 31, 32 by employing the first supply path and the second supply path. FIG. 6A and FIG. 7A illustrate respectively the state at the start of diffusion of first fluid 31 and second fluid 32.

Figure 6B:
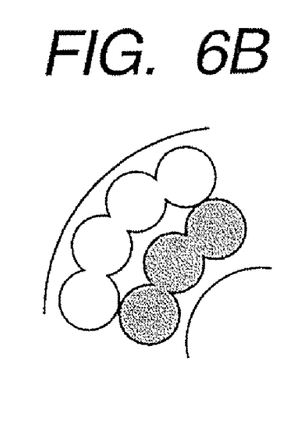
Figure 6C:
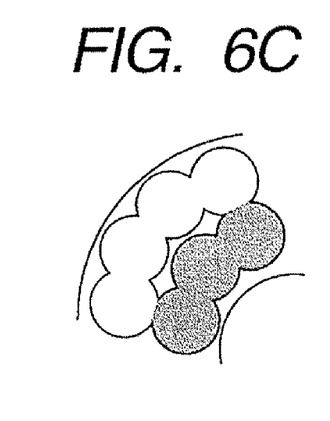
Figure 6D:
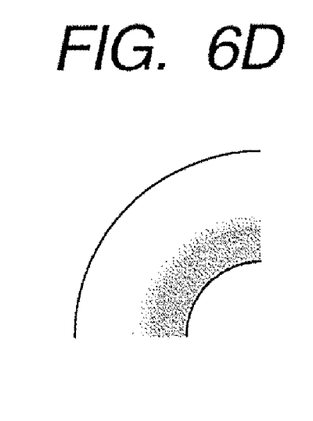
Figure 7A:
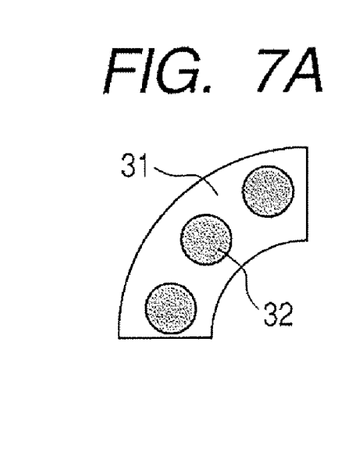
FIGS. 7A, 7B, 7C, and 7D are schematic drawing illustrating respectively a part of the fluid-processing device of Example 2.

In the prior art technique shown in FIGS. 6A, 6B, 6C and 6D, streams of first fluid 31 come into contact and join together as shown in FIG. 6B, the joined first fluid come into contact with similarly joined second fluid 32 to start the diffusion between the first and second fluids as shown in FIG. 6C, and then comes to the state as shown in FIG. 6D.

Figure 7B:
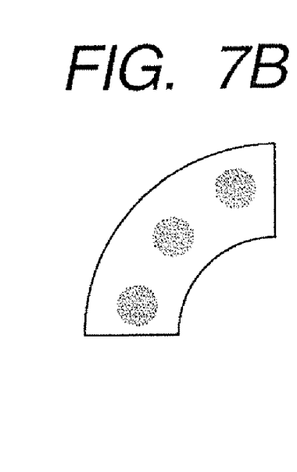
Figure 7C:
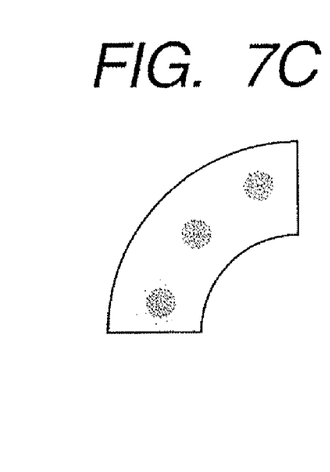
Figure 7D:
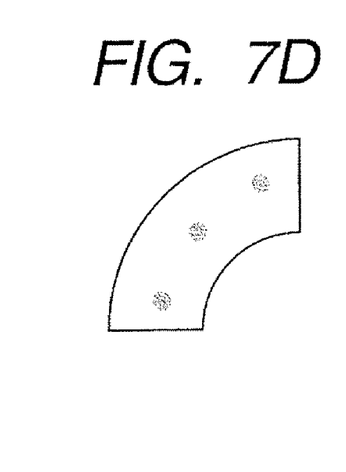

On the other hand, in the present invention as shown in FIGS. 7A, 7B, 7C and 7D, second fluid 32 comes into contact with first fluid 31 as shown in FIG. 7A immediately after discharge from the second supply path, and the reaction proceeds as shown in FIGS. 7B, 7C and 7D. Thus, in the present invention, the first fluid and the second fluid come to contact with each other in the stage of FIG. 7B, with a large contact area owing to enclosure of slender bar-shaped second fluid by the first fluid. As understood from these drawings, in the present invention, since the slender bar-shaped stream of the second fluid is surrounded by the flow of the first fluid during the supply, the two fluids come into contact with a larger contact area, so that the reaction proceeds in a shorter time. Therefore the reaction is allowed to proceed stably with prevention of a side reaction.

Example 3

A mixer device is constructed in the same manner as in Example 2 except that the outside diameter of inner tube 20 is 51 mm and the inside diameter of outer tube 21 is 52 mm. The thin space is 500 μm in thickness between the tube walls, the same as that in Example 2. However, with the same gap distance 500 μm, the sectional area of the gap perpendicular to the fluid flow direction is larger than that of Example 2, which enables increase of the feed rate of the fluids through first feed inlet 2 and second feed inlet 3.

Example 4

Figure 3A:
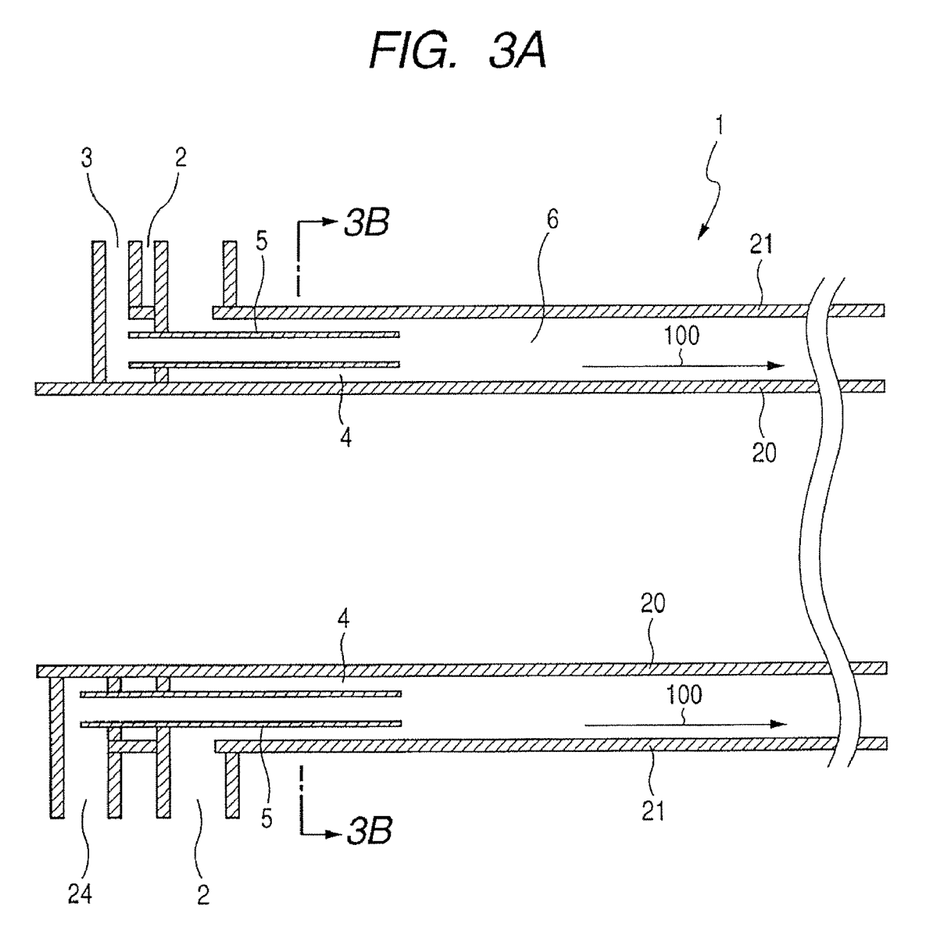
Figure 3B:
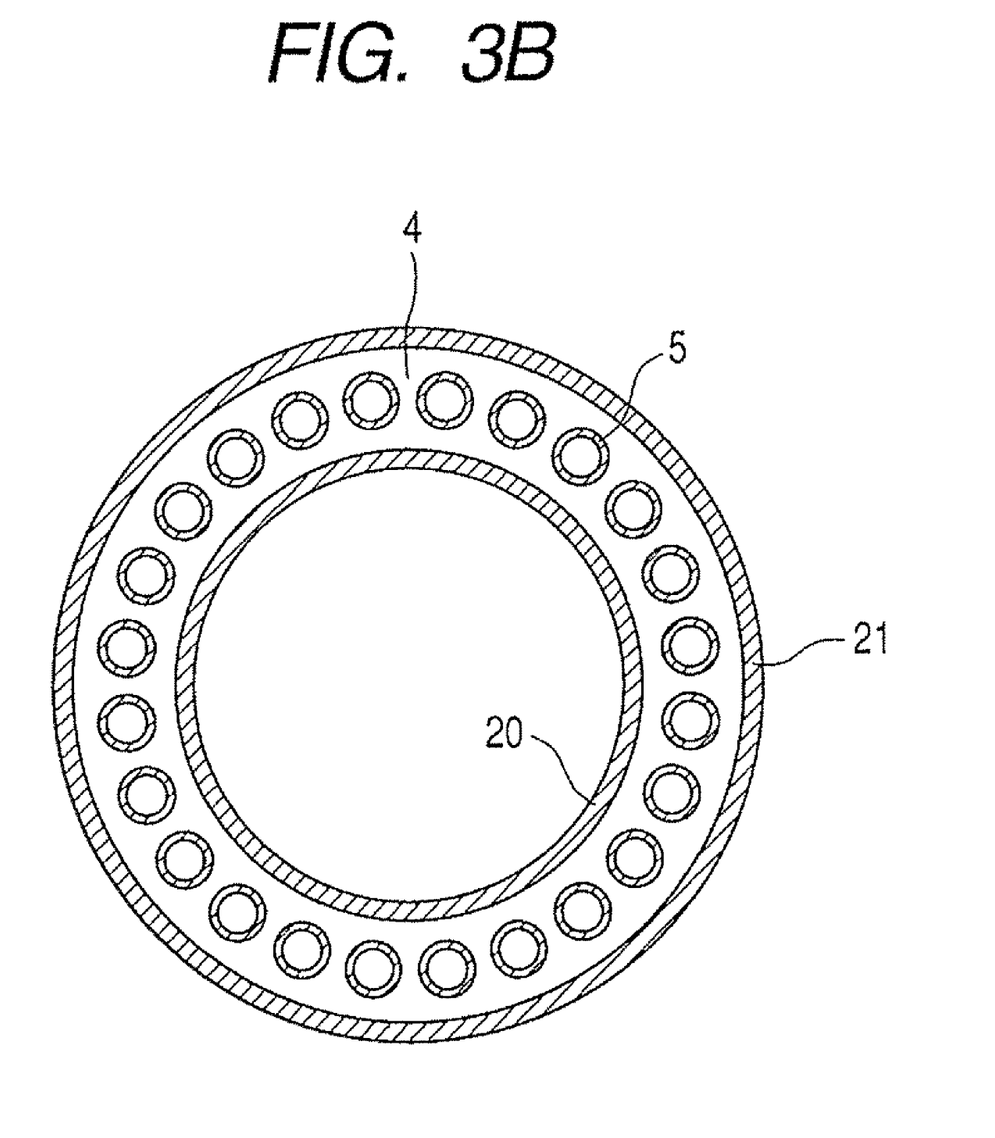

The fluid-processing device (mixer device) of this Example is explained by reference to FIGS. 3A and 3B.

A first fluid is introduced through first feed inlet 2, a second fluid is introduced through second feed inlet 3, and a third fluid is introduced through third feed inlet 24 into the mixer device. Mixer device 1 mixes, in a laminar flow state, the three fluids (the first, second, and third fluids) introduced through first feed inlet 2, second feed inlet 3, and third feed inlet 24.

In this Example, the interspace is formed by a double-tube so as to have a cross-section in a ring-shape perpendicular to the direction of the flow in the interspace. Inner tube 20 has an outside diameter of 26 mm, and outer tube 21 has inside diameter of 27 mm. Inner tube 20 is placed at the center of the outer tube 21. Thus the interspace between the outside wall of inner tube 20 and the inside wall of outer tube 21 is 500 μm. Nozzles 5 are placed along the middle line of the annular interspace in the periphery direction at a constant nozzle pitch so as to form thin spaces 4. The nozzle is a round pipe having an outside diameter of 280 μm and an inside diameter of 200 μm. Space 44 consists of the thin spaces 4 and clearances between nozzles 5 and the inner and outer tubes.

Nozzles 5 for supplying the second fluid fed through second feed inlet 3 and nozzles 5 for supplying the third fluid fed through third feed inlet 24 are placed alternately. The first fluid is fed in the space 44 through first feed inlet 2 at the upstream side of the outlets of nozzles 5. The second fluid fed through second feed inlet 3 and the third fluid fed through third feed inlet 24 are discharged from nozzles 5.

The first fluid fills thin space 4 and then comes into contact with the second fluid and the third fluid flowing out from nozzles 5. The streams of the second fluid and the third fluid are surrounded during the supply by the flow of the first fluid passed through thin spaces 4. Thereby the streams of the second fluid and the third fluid can be kept in a slender bar-shaped laminar flow state. The second fluid and the third fluid in a laminar flow state in a slender bar shape has an increased area of contact, in micro-flow channel 6, with the first fluid introduced through first feed inlet 2. After efficient diffusion and mixing, the fluid mixture is discharged from a discharge outlet (not shown in the drawing).

In micro-flow channel 6, fluid stagnation will not occur, since the flow of the fluid is linear and abrupt flow change is not caused. In the thin tubular laminar flow, the flow rate distribution occurs only in the thickness direction of the thin space, which minimizes variation of mixing and reaction among nozzles 5. This type of mixer device is also effective for a system in which a first fluid and a second fluid are allowed to react with each other and then the reaction product is further allowed to react with a third fluid, or for a system in which a first fluid and a third fluid are allowed to react with each other and then the reaction product is further allowed to react with a second fluid.

Example 5

The fluid-processing device (mixer device) of this Example is explained by reference to FIGS. 4A and 4B.

Mixer device 1 is constituted of three mixer elements: peripheral mixer element 7, inner mixer element 8, and innermost mixer element 9. Inner tube 10 of the peripheral mixer element serves as the outer tube of the inner mixer element, and inner tube 12 of the inner mixer element serves as the outer tube of the innermost mixer element. Inner mixer element 8 is placed inside the peripheral mixer element coaxially. Outer tube 11 of the peripheral mixer element is a circular tube having outside diameter of 23.4 mm and an inside diameter of 21.8 mm, and inner tube 10 thereof is a circular tube having an outside diameter of 20.8 mm, and an inside diameter of 19.2 mm. Inner tube 12 of the inner mixer element is a circular tube having an outside diameter of 18.2 mm and an inside diameter of 16.6 mm. Inner tube 13 of the innermost mixer element has an outside diameter of 15.6 mm. This tube may be a solid cylinder since it does not hold a mixer element inside. As a result, peripheral mixing element 7, inner mixing element 8 and innermost mixing element 9 form their respective interspaces as shown in FIGS. 4A and 4B. The interspaces of peripheral mixing element 7, inner mixing element 8 and innermost mixing element 9 have respectively a cross-section in a ring shape perpendicular to the flow direction. The thickness of the interspaces between the tube walls are respectively 500 μm. Nozzles 5 are arranged in the middle positions in the interspaces at a constant pitch around the axis of peripheral mixing element 7.

Nozzles 5 are respectively a circular pipe having an outside diameter of 300 μm and an inside diameter of 240 μm. Each of the interspaces is thus formed by two different tubes.

The first fluid is fed into space 44 through first feed inlet 2 and is introduced into the upstream side of the outlet of the fluid-introducing nozzles 5. The second fluid through second feed inlet 3 is introduced through nozzles 5. The first fluid introduced through first feed inlet 2 fills thin space 4 around nozzles 5, and comes into contact with the second fluid in a microchannel 6 (not shown in the drawing). During the supply of the two fluids, the streams of the second fluid are surrounded by the flow of the first fluid passed through thin spaces 4, so that the stream of the second fluid flowing out from the nozzles can be kept in a slender bar-shaped laminar flow state.

The second fluid in slender bar-shaped laminar flow streams is brought into contact, with an increased contact area, with the first fluid introduced through first feed inlet 2 to cause more effective diffusion and mixing, and is discharged from a discharge outlet (not shown in the drawing). In micro-flow channel 6, fluid stagnation will not occur, since the flow of the fluid is linear and abrupt flow change is not caused. In the thin tubular laminar flow, the flow rate distribution occurs only in the thickness direction of the interface, which minimizes variation of mixing and reaction among nozzles 5.

Example 6

Figure 5A:
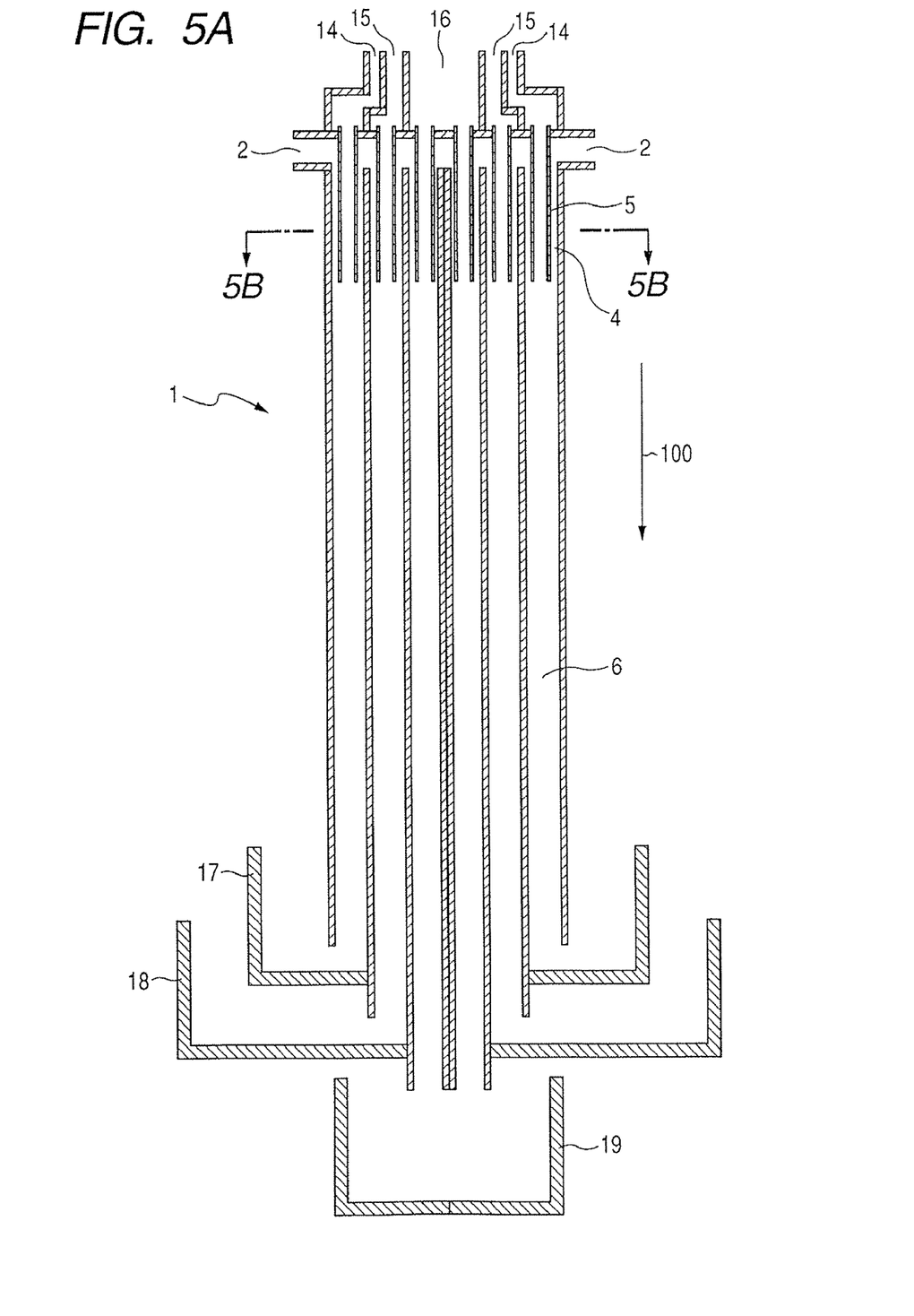
Figure 5B:
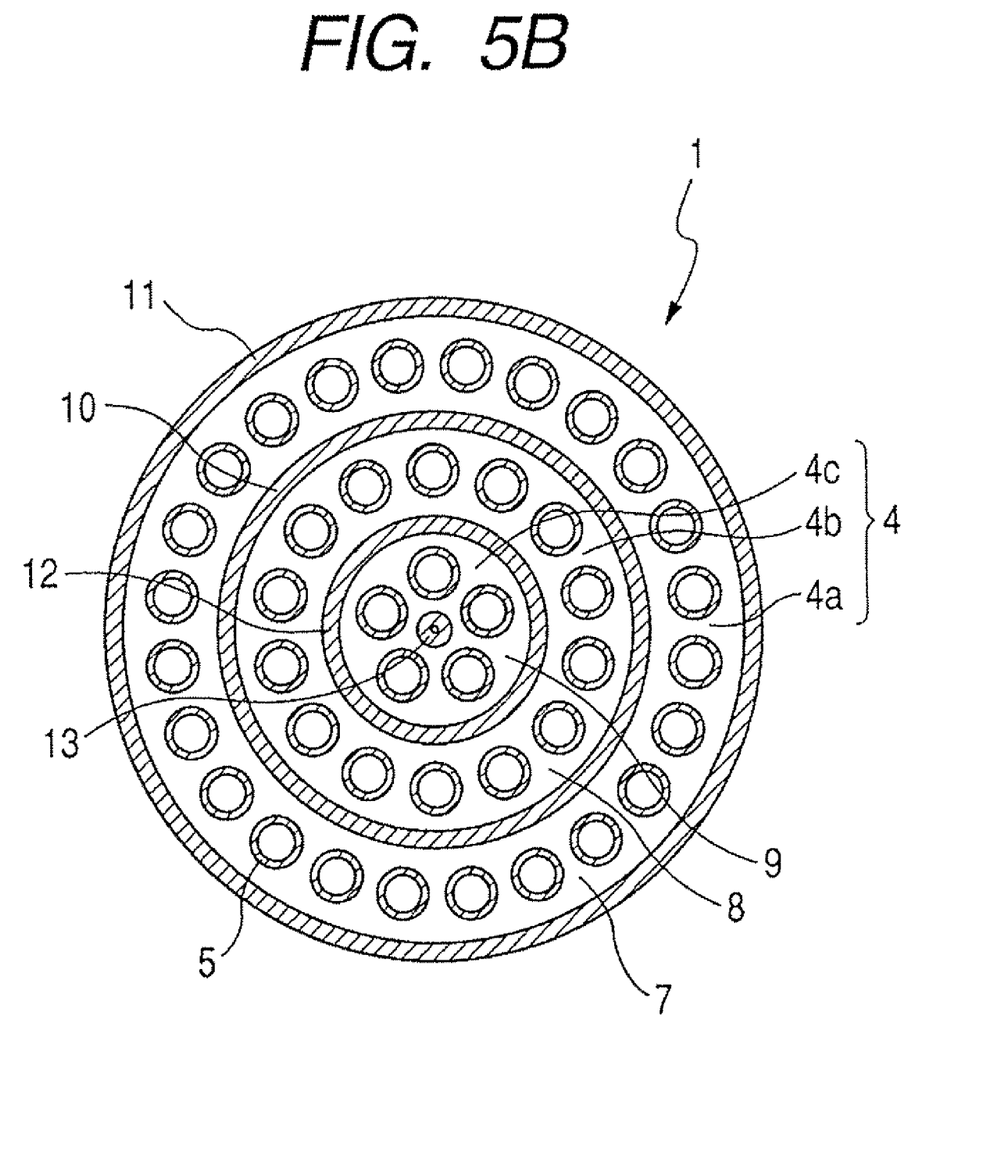

The fluid-processing device (mixer device) of this Example is explained by reference to FIGS. 5A and 5B.

In this Example, a feed inlet for introducing a fluid into nozzles 5 is provided independently for each of the mixing elements: peripheral mixing element 7, inner mixing element 8, and innermost mixing element 9. Thereby different fluids can be introduced through nozzles 5 of peripheral mixing element 7, inner mixing element 8, and innermost mixing element 9. Further, the lengths of micro flow channels 6 are decreased successively in the order of peripheral mixing element 7, inner mixing element 8, and innermost mixing element 9. Otherwise, the mixer device is the same as that in Example 5. In the case where different kinds of mixing or chemical reactions are conducted, the fluids discharged from the respective mixer elements, the fluids discharged from the respective mixer elements can be recovered separately without mixing of the fluids.

Example 7

In the mixing device of this Example, a fluid feed inlet for feeding a fluid to space 44 is provided for each of mixing elements: peripheral mixing element 7, inner mixing element 8, and innermost mixing element 9. Otherwise, the mixer device is the same as that in Example 6. Thereby, different fluids can be introduced independently to portions of nozzle clearances of peripheral mixing element 7, inner mixing element 8, and innermost mixing element 9.

In Example 6, the same fluid is introduced commonly into the nozzle clearance in peripheral mixing element 7, inner mixing element 8, and innermost mixing element 9. In contrast, in this Example, different kinds of fluids can be allowed to flow independently to peripheral mixing element 7, inner mixing element 8, and innermost mixing element 9. Therefore, according to this Example, the simultaneously conducted mixing or reactions can be selected from a broader range.

The fluid-processing device (mixer device) of the present invention gives a large contact area for the volume between the fluids to be mixed, and does not cause stagnation of the fluids and the products in the micro-flow channel. Therefore the fluid processing device of the present invention is useful for mixing or formation of a functional substance in mass production.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-231267, filed Aug. 9, 2005, which is hereby incorporated by reference herein in its entirety.

The invention claimed is:

1. A fluid-processing device for bringing two kinds of fluids into contact to mix or react with each other, comprising:
a first supply path constituted by an annular space formed between an outer tube and an inner tube placed inside the outer tube in a concentric arrangement, the first supply path communicating with a first feed inlet for feeding a first fluid into the annular space; and
plural second supply paths arranged in the annular space of the first supply path as surrounding the inner tube, the second supply paths communicating with a second feed inlet for feeding a second fluid into the second supply paths,
wherein the second supply paths are arranged in parallel with a supply direction of the first fluid and spaced from the outer tube and the inner tube to form gaps therebetween such that the first fluid surrounds the second supply paths, the second fluid being discharged from fluid outlets of the second supply paths, the fluid outlets being surrounded by the first fluid in said gaps such that the second fluid is surrounded by the first fluid when the second fluid is discharged into the first supply path.

2. The fluid-processing device according to claim 1, wherein the second supply paths each have a diameter ranging from 50 um to 2000 um.

3. The fluid-processing device according to claim 1, wherein the first supply path has a cross-section in a ring shape perpendicular to the supply direction of the first fluid.

4. The fluid-processing device according to claim 3, wherein the plural second supply paths are arranged along the ring shape.

5. The fluid processing device according to claim 1, wherein the device further comprises another first supply path constituted by another annular space formed between the outer tube and a further tube provided around the outer tube, and wherein another set of second supply paths are arranged in the another annular space as surrounding the outer tube.

* * * * *